United States Patent [19]
Krause

[11] Patent Number: 5,236,684
[45] Date of Patent: Aug. 17, 1993

[54] PROCESS FOR THE PREPARATION OF SPHERICAL AMORPHOUS SILICON NITRIDE

[75] Inventor: Werner Krause, Hürth, Fed. Rep. of Germany

[73] Assignee: Hoechst Aktiengesellschaft, Frankfurt am Main, Fed. Rep. of Germany

[21] Appl. No.: 792,152

[22] Filed: Nov. 8, 1991

[30] Foreign Application Priority Data

Nov. 24, 1990 [DE] Fed. Rep. of Germany ....... 4037449

[51] Int. Cl.$^5$ ............................................. C01B 21/068
[52] U.S. Cl. ........................................ 423/344; 501/97
[58] Field of Search ......................... 423/344; 501/97; 422/129

[56] References Cited

U.S. PATENT DOCUMENTS

| | | | |
|---|---|---|---|
| 3,959,446 | 5/1976 | Mazdiyasni et al. | 423/344 |
| 4,122,155 | 10/1978 | Prochazka et al. | 423/344 |
| 4,416,863 | 11/1983 | Sato et al. | 423/344 |
| 4,891,339 | 1/1990 | Calcote et al. | 423/344 |
| 4,929,432 | 5/1990 | Shen | 423/344 |

FOREIGN PATENT DOCUMENTS 0070440 1/1983 European Pat. Off. .
54-124898 9/1979 Japan ................................. 423/344

OTHER PUBLICATIONS

Patent Abstracts of Japan, vol. 13, No. 315 [3663], 1989.
Patent Abstracts of Japan, vol. 14, No. 382 [4325], 1990.

*Primary Examiner*—R. Bruce Breneman
*Attorney, Agent, or Firm*—Connolly and Hutz

[57] ABSTRACT

To prepare spherical amorphous silicon nitride ($Si_3N_4$), a silicon halide and ammonia are reacted in the vapor phase in the absence of water or water vapor in a vertically arranged reaction container, a silicon halide/ammonia reaction product being formed. In this reaction, a silicon halide/inert gas mixture is passed into the lower part of the reaction container and ammonia is passed into its upper part, the ratio of $SiHal_4:NH_3$ being 1:(5.8 to 6.6). By establishing a stationary state, the reaction takes place only in the central part of the reaction container. After the silicon halide/ammonia reaction product has been removed from the reaction container, it is heated to temperatures of 950° to 1150° C. in an atmosphere containing ammonia.

13 Claims, 2 Drawing Sheets

PROCESS FOR THE PREPARATION OF SPHERICAL AMORPHOUS SILICON NITRIDE

The present invention relates to a process for the preparation of spherical amorphous silicon nitride ($Si_3N_4$) by heating a silicon halide/ammonia reaction product in the absence of water or water vapor.

Densely sintered silicon nitride (SSN) is a material which is distinguished, inter alia, by high strength and corrosion resistance, even at high temperatures, and moreover has a relatively low density, compared with metallic materials, of $3.2$ g/cm$^3$. Densely sintered silicon nitride is therefore an interesting construction material, for example in engine and turbine construction.

To obtain a densely sintered silicon nitride having the desired material properties, it is necessary for a silicon nitride powder which is very pure, consists of roundish particles having particle sizes of $<1$ μm and has a low content of $\beta$-$Si_3N_4$ to be employed for the sintering (cf. G. Wötting and G. Ziegler in: SPRECHSAAL, 120 (1987) pages 96 to 99).

Various processes are used for the preparation of silicon nitride powders:

a) direct nitridation $$3Si + 2N_2 \longrightarrow Si_3N_4$$

b) the carbothermal process $$3SiO_2 + 6C + 2N_2 \longrightarrow Si_3N_4 + 6CO$$

c) diimide conversion $$SiCl_4 + 6NH_3 \longrightarrow Si(NH_2) + 4NH_4Cl$$

$$3Si(NH)_2 \longrightarrow Si_3N_4 + 2NH_3$$

d) gas phase reaction $$3SiCl_4 + 4NH_3 \longrightarrow Si_3N_4 + 4HCl$$

A process according to c) is known from U.S. Pat. No. 3,959,446. According to this process, highly pure liquid silicon tetrachloride and anhydrous ammonia gas are reacted in dry benzene or n-hexane at temperatures of $-10°$ C. to $+5°$ C. to form a precipitating mixture of silicon diimide and ammonium chloride. After the solvent has been distilled off, the mixture is present in finely divided form. The dry mixture is heated to 1200 to 1350° C. in vacuo or in an inert gas atmosphere and is kept at this temperature for several hours. After cooling, finely divided $\alpha$-$Si_3N_4$ is present.

A disadvantage here is that the mixture of silicon diimide and ammonium chloride intermediately formed consists of irregularly shaped particles having particle sizes of $<1$ μm to about 20 μm and therefore has poor flow properties, which presents difficulties during conveying and further processing of the particles.

The object of the present invention is therefore to provide a process for the preparation of spherical silicon nitride, the particles of which lie within a narrow diameter range and have good flow properties. This is achieved, according to the invention, by a process which comprises reacting a silicon tetrahalide and ammonia in the vapor phase in a vertically arranged reaction container to form the silicon halide/ammonia reaction product, a silicon halide/inert gas mixture being passed into the lower part of the reaction container and ammonia being passed into its upper part, the ratio of $SiHal_4$:$NH_3$ being 1:(5.8 to 6.6), establishing a stationary state so that the reaction takes place only in the central part of the reaction container, and removing the silicon halide/ammonia reaction product from the reaction container and heating it to temperatures of 950° to 1150° C. in an ammonia-containing atmosphere.

The process according to the invention can furthermore also be carried out, if appropriate, by a) obtaining the silicon halide/inert gas mixture by passing an inert gas through a liquid silicon halide kept at temperatures of 0° to 57° C.;

b) additionally passing an inert gas into the lower part of the reaction container;

c) using a volume ratio of the inert gas to the silicon halide/inert gas mixture of (100 to 0.1):1;

d) establishing and maintaining the stationary state in the reaction container by regulating the flows of silicon halide/inert gas mixture and/or ammonia and/or additional inert gas;

e) employing silicon tetrachloride ($SiCl_4$), trichlorosilane ($SiHCl_3$) or mixtures thereof as the silicon halide; and f) using nitrogen as the inert gas.

In the process according to the invention, the silicon halide/inert gas mixture which is passed in from the bottom and has a high specific gravity meets the ammonia gas flowing in from the top in the center of the container, spherical silicon halide/ammonia reaction product being formed, surprisingly no mixing of the entire contents of the container taking place, in spite of the vigorous reaction. Rather, of the silicon halide/nitrogen gas mixture in the lower part of the reaction container, essentially only its upper interface participates in the reaction.

In the process according to the invention, the silicon halide/ammonia reaction product formed in the ga phase collects in the lower, reaction-free region of the reaction container as spherical particles. Since these particles are thus withdrawn from after-reaction at their surface, they remain unchanged in their external shape and do not cake together.

In the process according to the invention, the particle size of the silicon halide/ammonia reaction product formed depends on the sedimentation rate of the particles in the reaction zone. By passing an additional stream of inert gas into the lower part of the reaction container and therefore against the sedimentation direction, the residence time in the reaction zone and therefore the average particle diameter of the silicon halide/ammonia reaction product can be increased.

The silicon halide/ammonia reaction product obtained in the process according to the invention has excellent flow properties, because of its spherical design, and can therefore be removed from the lower part of the reaction container in a simple manner, for example by opening a ball valve, and conveyed into a calcining furnace without problems with the aid of a screw.

The spherical shape and the average particle diameter are also retained in the process according to the invention if the silicon halide/ammonia reaction product is heated at temperatures of between 950° and 1150° C. in an ammonia-containing atmosphere.

Figure 1:
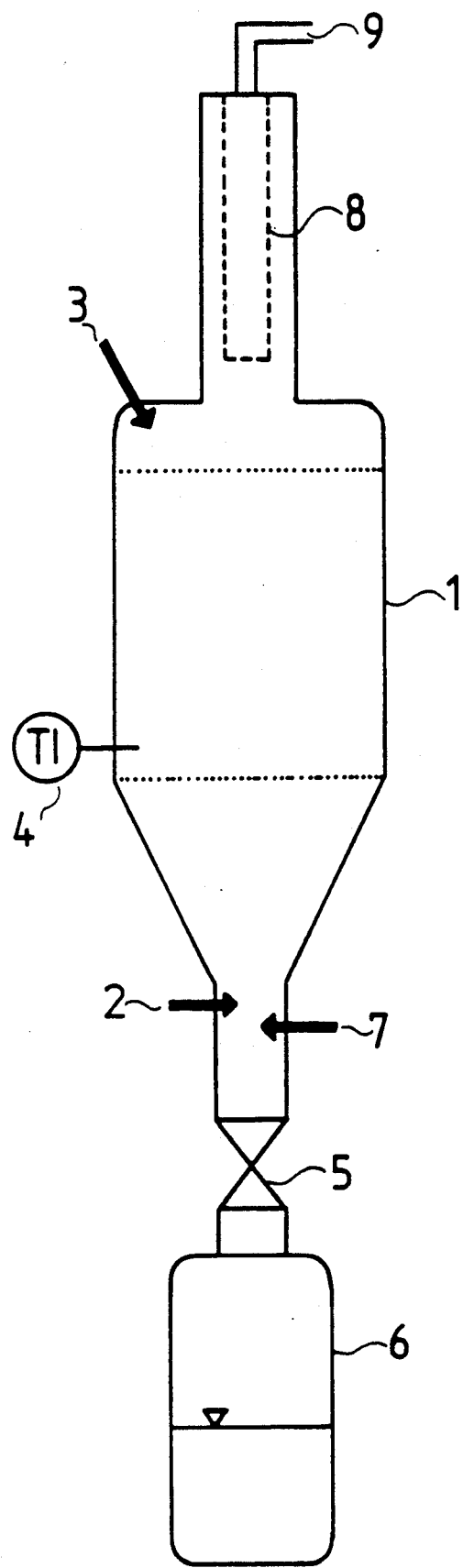
FIG. 1 is a diagram of a plant for carrying out the process of the invention.

A silicon halide/nitrogen gas mixture is passed into the lower part of the reaction container 1 via a first line 2, while ammonia is fed into the upper part via a second line 3. The two components react in the center of the container 1 to give a reaction product which consists of individual spherical particles. The course of the reaction is controlled with the aid of temperature measuring devices 4. The reaction product collects in the cone of the reaction container 1 and is discharged from time to time via a valve 5 into a collecting tank 6. By blowing in an additional stream of inert gas via a third line 7, smaller particles are conveyed back to the reaction zone, where they participate in the reaction again, so that the average particle diameter of the reaction product can be increased in this manner. Unreacted ammonia and the inert gas are freed from extremely fine entrained portions with the aid of a filter 8 and removed via a waste gas line 9.

The first line 1 and the second line 2 for the components remain completely free from encrustations, since these lines ar positioned in those regions of the reaction container 1 where no reaction takes place. Even during continuous operation, the container walls do not become covered with firmly adhering layers of powder.

EXAMPLE 1

A vertical reaction container 1 (cf. FIG. 1) is constructed like a cone in its lower part, the tip of the cone ending in a tube closed with a ball valve 5. A silicon tetrachloride/nitrogen gas mixture which has been obtained by passing 200 l/hour of nitrogen through silicon tetrachloride kept at about 25° C. and contained 0.5 kg of silicon tetrachloride per hour was passed into the first line 2 connected to the tip of the cone. 450 l/hour of dried ammonia gas flowed into the upper part of the reaction container 1 via the second line 3. With the ball valve 5 partly opened, 0.8 kg/hour of silicon tetrachloride/ammonia reaction product dropped into the collecting tank 6. After the silicon tetrachloride/ammonia reaction product had been heated at 1000° C. in a calcining furnace, a spherical amorphous silicon nitride was obtained having particle sizes of 5 to 10 $\mu$m, the chlorine content of which was <0.5% by weight and the carbon content of which was <0.06% by weight and which had a specific surface area (determined by the method of Brunauer, Emett and Teller; cf. Z. Anal. Chem. 238 (1968), pages 187 to 193 ) of 360 m$^2$/g.

Figure 2:
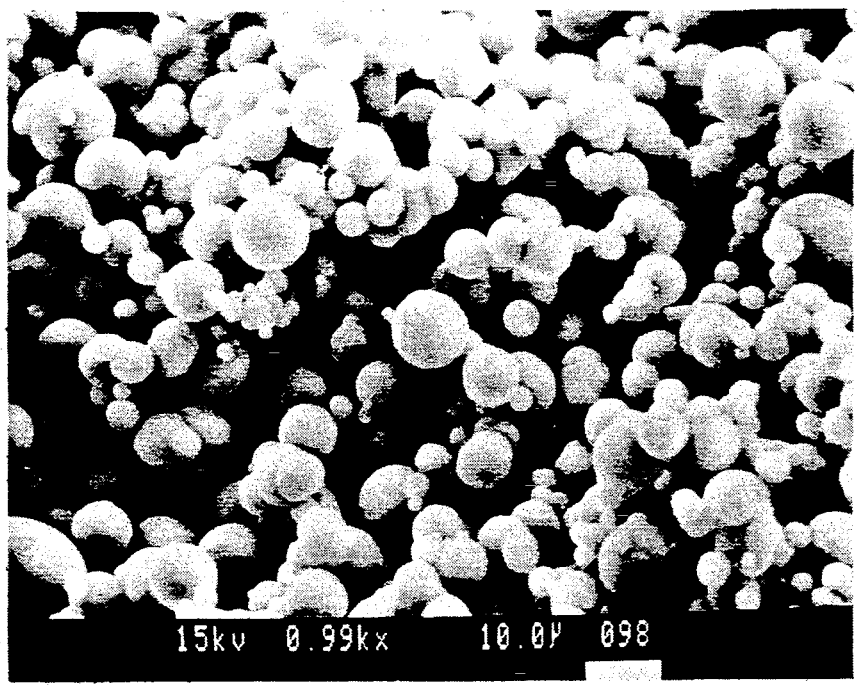
FIG. 2 is a photomicrograph of silicon nitride obtained according to Example 1.

FIG. 2 shows a photomicrograph of the silicon nitride obtained.

EXAMPLE 2

Example 1 was repeated, with the modification that 500 l/hour of nitrogen were additionally introduced into the lower region of the reaction container 1 via the third line 7. With the ball valve 5 partly opened, 0.8 kg/hour of silicon tetrachloride/ammonia reaction product dropped into the collecting tank 6.

Figure 3:
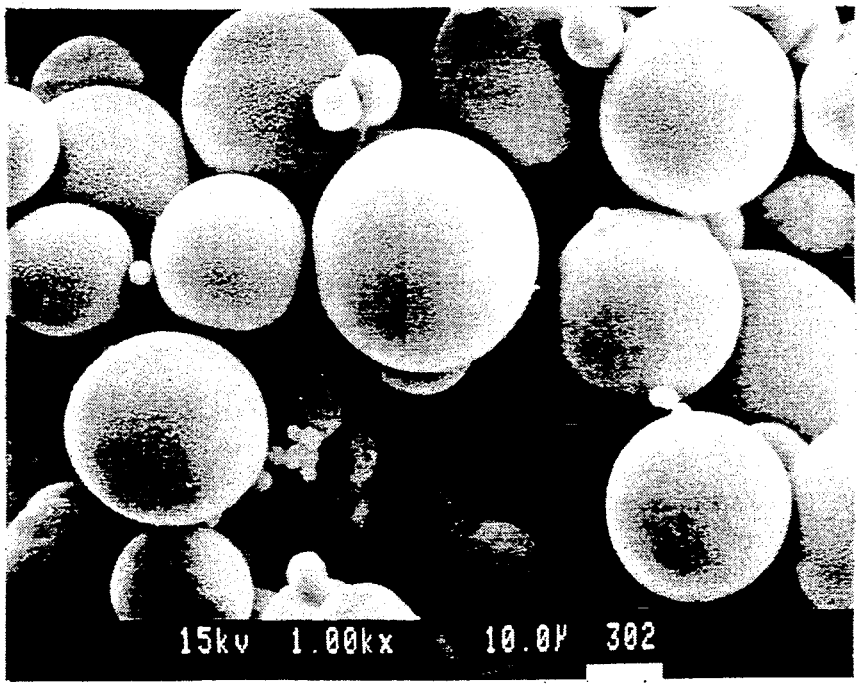
FIG. 3 is a photomicrograph of silicon nitride obtained according to Example 2.

After the silicon tetrachloride/ammonia reaction product had been heated at 1000° C. in a calcining furnace, an amorphous silicon nitride was obtained in the form of spherical particles of 25 to 30 $\mu$m diameter, the chlorine content of which was <0.5% by weight and the carbon content of which was <0.06% by weight and which had a specific surface area (determined by the BET method; cf. Example 1) of 350 m$^2$z/g. FIG. 3 shows a photomicrograph of the silicon nitride obtained.

We claim:

1. A process for the preparation of spherical amorphous silicon nitride ($Si_3N_4$) by heating a silicon halide/ammonia reaction product in the absence of water or water vapor, which comprises reacting a silicon halide and ammonia in the vapor phase in a vertically arranged reaction container to form the silicon halide/ammonia reaction product, a silicon halide/inert gas mixture being passed into the lower part of the reaction container and ammonia being passed into its upper part, the molar ratio of silicon halide:$NH_3$ being 1:(5.8 to 6.6); establishing a stationary state so that the reaction takes place only in the central part of the reaction container; and removing the silicon halide/ammonia reaction product from the reaction container and heating it to temperatures of 950° to 1150° C. in an ammonia-containing atmosphere.

2. The process as claimed in claim 1, wherein the silicon halide/inert gas mixture is obtained by passing an inert gas through a liquid silicon halide kept at temperatures of 0° to 57° C.

3. The process as claimed in claim 1, wherein an inert gas is additionally passed into the lower part of the reaction container.

4. The process as claimed in claim 1, wherein the volume ratio of the inert gas to the silicon halide/inert gas mixture is (100 to 0.1):1.

5. The process as claimed in claim 1, wherein the stationary state is established and maintained in the reaction container by regulating the flow of the silicon halide/inert gas mixture.

6. The process as claimed in claim 1, wherein the stationary state is established and maintained in the reaction container by regulating the flow of the ammonia.

7. The process as claimed in claim 1, wherein the stationary state is established and maintained in the reaction container by regulating the flow of the additional inert gas.

8. The process as claimed in claim 1, wherein silicon tetrachloride ($SiCl_4$) is employed as the silicon halide.

9. The process as claimed in claim 1, wherein trichlorosilane ($SiHCl_3$) is employed as the silicon halide.

10. The process as claimed in claim 1, wherein mixtures of silicon tetrachloride ($SiCl_4$) and trichlorosilane ($SiHCl_3$) are employed as the silicon halide.

11. The process as claimed in claim 1, wherein nitrogen is used as the inert gas.

12. The process as claimed in claim 2, wherein nitrogen is used as the inert gas.

13. The process as claimed in claim 3, wherein nitrogen is used as the inert gas.

* * * * *